United States Patent [19]

Shimakura

[11] Patent Number: 5,608,910

[45] Date of Patent: Mar. 4, 1997

[54] METHOD FOR UPDATING A CONTROL PROGRAM FOR AN INFORMATION PROCESSING APPARATUS, AND AN INFORMATION PROCESSING APPARATUS FOR UPDATING A CONTROL PROGRAM OF AN ASSOCIATED REWRITABLE MEMORY OR A MEMORY DISK

[75] Inventor: Masami Shimakura, Tokyo, Japan

[73] Assignee: Canon Kabushiki Kaisha, Tokyo, Japan

[21] Appl. No.: 240,211

[22] Filed: May 9, 1994

Related U.S. Application Data

[63] Continuation of Ser. No. 673,453, Mar. 22, 1991, abandoned.

[30] Foreign Application Priority Data

| Mar. 23, 1990 | [JP] | Japan | 2-072102 |
| Mar. 23, 1990 | [JP] | Japan | 2-072103 |
| Mar. 27, 1990 | [JP] | Japan | 2-075385 |

[51] Int. Cl.⁶ .................................................. G06F 13/00
[52] U.S. Cl. ................ 395/670; 364/962.1; 364/965.76; 364/975.1; 364/DIG. 2; 395/430
[58] Field of Search .................................. 395/650, 700, 395/430; 364/962.1, 965.76, 975.1

[56] References Cited

U.S. PATENT DOCUMENTS

| 4,443,861 | 4/1984 | Slater | 364/900 |
| 4,589,063 | 5/1986 | Shah et al. | 364/200 |
| 4,590,557 | 5/1986 | Lillie | 34/200 |
| 4,695,895 | 9/1987 | Nagashima | 358/280 |
| 4,809,214 | 2/1989 | Shimakura | 364/900 |
| 4,888,771 | 12/1989 | Benignus et al. | 371/16.1 |
| 5,075,841 | 12/1991 | Kaneko | 395/575 |
| 5,155,847 | 10/1992 | Kirouac et al. | 395/600 |

FOREIGN PATENT DOCUMENTS 0217351   4/1987   European Pat. Off. .

OTHER PUBLICATIONS

Rik Farrow, Unix System Security, Dec. 1990, pp. 191, 192.
Harvey M. Deitel, An Introduction to Operating Systems, 1990, pp. 548–553.
Patrick G. McKeown, Living with Computers, 1988, pp. 33–35.
Agnew, et al., IBM Technical Disclosure Bulletin, "Universal Chip", vol. 25, No. 2, pp. 567–568, Jul. 1982.

*Primary Examiner*—Kevin A. Kriess
*Assistant Examiner*—Michael T. Richey
*Attorney, Agent, or Firm*—Fitzpatrick, Cella, Harper & Scinto

[57] ABSTRACT

An information processing system includes (i) a memory medium for storing a control program that includes a region for storing information indicative of its version and (ii) an apparatus for effecting at least one of recording of information on and reproduction of information from the memory medium. That apparatus includes (i) a rewritable memory for storing a control program for controlling that apparatus, the control program including a region for storing information indicative of its version, (ii) a comparing device for comparing the version of the control program stored in the rewritable memory with the version of the control program stored in the memory medium and (iii) a device for replacing a control program of an older version with a control program of a newer version, in conformity with the comparison.

31 Claims, 8 Drawing Sheets

METHOD FOR UPDATING A CONTROL PROGRAM FOR AN INFORMATION PROCESSING APPARATUS, AND AN INFORMATION PROCESSING APPARATUS FOR UPDATING A CONTROL PROGRAM OF AN ASSOCIATED REWRITABLE MEMORY OR A MEMORY DISK

This application is a continuation of application Ser. No. 07/673,453, filed Mar. 22, 1991, now abandoned.

BACKGROUND OF THE INVENTION

1. Field of the Invention

This invention relates to a memory medium for renewing the control program of an information processing apparatus, and an information processing method and an information processing apparatus using such medium.

2. Related Background Art

The control program of a floppy disk apparatus, an optical disk apparatus or the like is stored in a read-only memory (ROM) in the apparatus, and a central processing unit (CPU) in the apparatus sequentially accesses the program from the ROM for execution. In some apparatuses, a part or whole of the control program is once down-loaded from the ROM into a random access memory (RAM), whereafter the program is sequentially accessed from the RAM for execution.

In recent years, in apparatuses of this kind, the complication of functions and higher functions have tended to be accompanied by the complication or increase of a control program held in the ROM or various control parameters necessary for control. Also, from the need for reduced costs, it has been a practice to replace hardware with firmware, i.e., make hardware into software, and thus rapidly increases the use of firmware. Generally, the increase of firmware includes the risk of increasing an iminent bug of the firmware as well.

On the other hand, in recent years, a commodity cycle has tended to become shorter in conformity with the advance of technology, and coupled with the increase of firmware, firmware is made into commodities and distributed in the market without the bug of the firmware being completely overcome. Also, in the aforementioned making of hardware into software, it is often the case that the enhancement of the function and performance of commodities can be realized by only the additional modification of the firmware, and even in the case of commodities once distributed in the market, a change of the function, performance or the like thereof is sometimes done from the user's strong demand.

When a change of the control program thus occurs from a change of the specification or an error in writing or the like, the interchange of the ROM becomes necessary. Generally, for the interchange of the ROM, it is necessary to follow the procedure of detecting the external members of the apparatus, and dismounting the ROM on a circuit board from a socket. On the other hand, however, since compactness and reduced costs of the apparatus are required, there is a case where the ROM is not mounted on the socket, but is mounted directly on the circuit board. In such a case, the interchange of the ROM involves soldering.

However, when the ROM is mounted directly on the circuit board, service cost increases with the interchange of the ROM. Also, the thermal destruction or deterioration of the surrounding elements by soldering, and secondary impediments such as bad soldering and breakage must be taken into consideration. Therefore, except for the case where the ROM is mounted on the socket, it is often the case that the interchange of the ROM is abandoned and the circuit board, or in some cases, the commodity, is bodily interchanged. In any case, an increase of service cost is unavoidable, and these interchanging operations are beyond the user's ability and thus, generally, the interchange at a place designated by each maker has been inevitable.

SUMMARY OF THE INVENTION

It is an object of the present invention to solve the above-noted problems peculiar to the prior art and to provide a method of effecting a change of the control program of an information processing apparatus without interchanging a ROM, and a memory medium used in this method.

It is another object of the present invention to provide an information processing apparatus which uses a memory medium in which a control program is memorized, whereby the control program can be changed without interchanging a ROM.

The above objects of the present invention are achieved by an information processing apparatus which has a rewritable memory storing therein a control program for controlling the operation of the apparatus itself and in which a renewed control program for rewriting the control program stored in the memory of said information processing apparatus is memorized in a memory medium removably mounted in said apparatus.

Also, the above objects of the present invention are achieved by an information processing apparatus according to the present invention for effecting at least one of the recording and reproduction of information on said medium, comprising:

a rewritable memory storing therein a control program for effecting the control of the apparatus itself;

means for judging whether the control program stored in said memory should be changed to the control program memorized in the memory medium;

means for reading out the control program from the medium when said judging means judges that said control program stored in said memory should be changed; and means for rewriting the control program stored in said memory into the control program read out from the medium.

Also, the above objects of the present invention are achieved by an information processing apparatus according to another embodiment of the present invention for effecting the recording of information on said medium, comprising:

a memory storing therein a control program for effecting the control of the apparatus itself;

means for judging whether the control program memorized in said memory medium should be changed to the control program stored in said memory;

means for taking the control program out of the memory when said judging means judges that the control program memorized in said memory medium should be changed; and means for recording the control program taken out of said memory on the medium.

Further, the above objects of the present invention are achieved by a method of renewing a control program for effecting the control of the operation of an information processing apparatus itself which is stored in the rewritable memory of the apparatus, by the use of said medium, comprising the steps of:

judging whether the control program stored in said memory should be changed to the control program memorized in the memory medium;

reading the control program out of the medium when it is judged that the control program stored in said memory should be changed; and rewriting the control program stored in said memory into the control program read out of the medium.

Also, the above objects of the present invention are achieved by a method of changing the control program memorized in said medium to a control program stored in the memory of an information processing apparatus, comprising the steps of:

judging whether the control program memorized in said memory medium should be changed to the control program stored in said memory;

taking the control program out of the memory when it is judged that the control program memorized in said memory medium should be changed; and recording the control program taken out of said memory on the medium.

DESCRIPTION OF THE PREFERRED EMBODIMENTS

Figure 1:
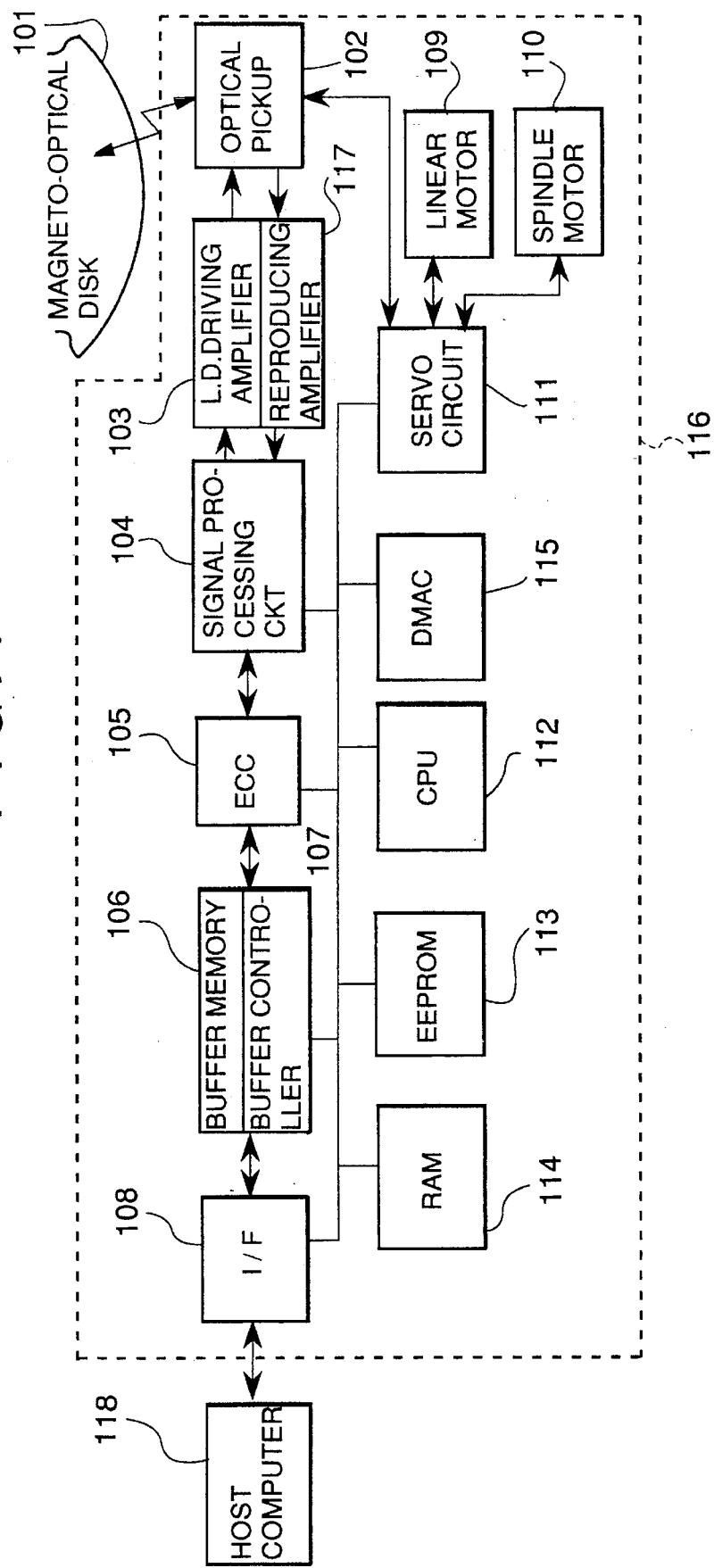
FIG. 1 is a block diagram showing an embodiment of the information processing system of the present invention.

FIG. 1 is a block diagram showing an embodiment of the information processing system of the present invention. This embodiment is one in which the present invention is applied to a magneto-optical disk system.

The system of FIG. 1 is comprised of a magneto-optical disk drive 116 as an information processing apparatus, and a magneto-optical disk as a memory medium removably mounted in the apparatus. In the drive 116, the reference numeral 102 designates an optical pickup for stably recording information on a disk 101 and faithfully reproducing it. The reference numeral 103 denotes an LD driving amplifier for driving a laser diode (LD) in the optical pickup 102, and the reference numeral 117 designates a reproducing amplifier for amplifying the reproduction signal of a photodiode receiving the return light of laser light from the disk. The reference numeral 104 denotes a signal processing circuit for converting a digital signal into an analog signal during recording and converting an analog signal into a digital signal during reproduction. The reference numeral 105 designates an error correcting circuit (hereinafter abbreviated as ECC) for recording and reproduction of data. The reference numeral 106 denotes a buffer memory for temporarily holding the recording and reproduction data. The reference numeral 107 designates a buffer controller for controlling the buffer memory and effecting the transfer of the recording and reproduction data. The reference numeral 108 denotes an interface circuit (hereinafter abbreviated as I/F) for connecting the drive 116 to an outside host computer 118. The reference numeral 109 designates a linear motor for moving the optical pickup 102 radially of the disk. The reference numeral 110 denotes a spindle motor for rotating the disk 101. The reference numeral 111 designates a servo circuit for controlling the driving systems of the optical pickup 102, the linear motor 109 and the spindle motor 110, respectively. The reference numeral 112 denotes a central processing unit (CPU) for controlling the operation of the entire drive and for interpreting and executing the command from the host computer. The reference numeral 113 designates an electrically erasable and rewritable read-only memory (hereinafter abbreviated as EEPROM) in which the control program of the CPU 112 is stored. The reference numeral 114 denotes a random access memory (hereinafter abbreviated as RAM) capable of providing the work area of the CPU 112 and at the same time, temporarily holding the control program. The reference numeral 115 designates a direct memory access controller for rapidly effecting mutual data transfer among the EEPROM 113, the RAM 114 and the buffer memory 106.

Figure 2:
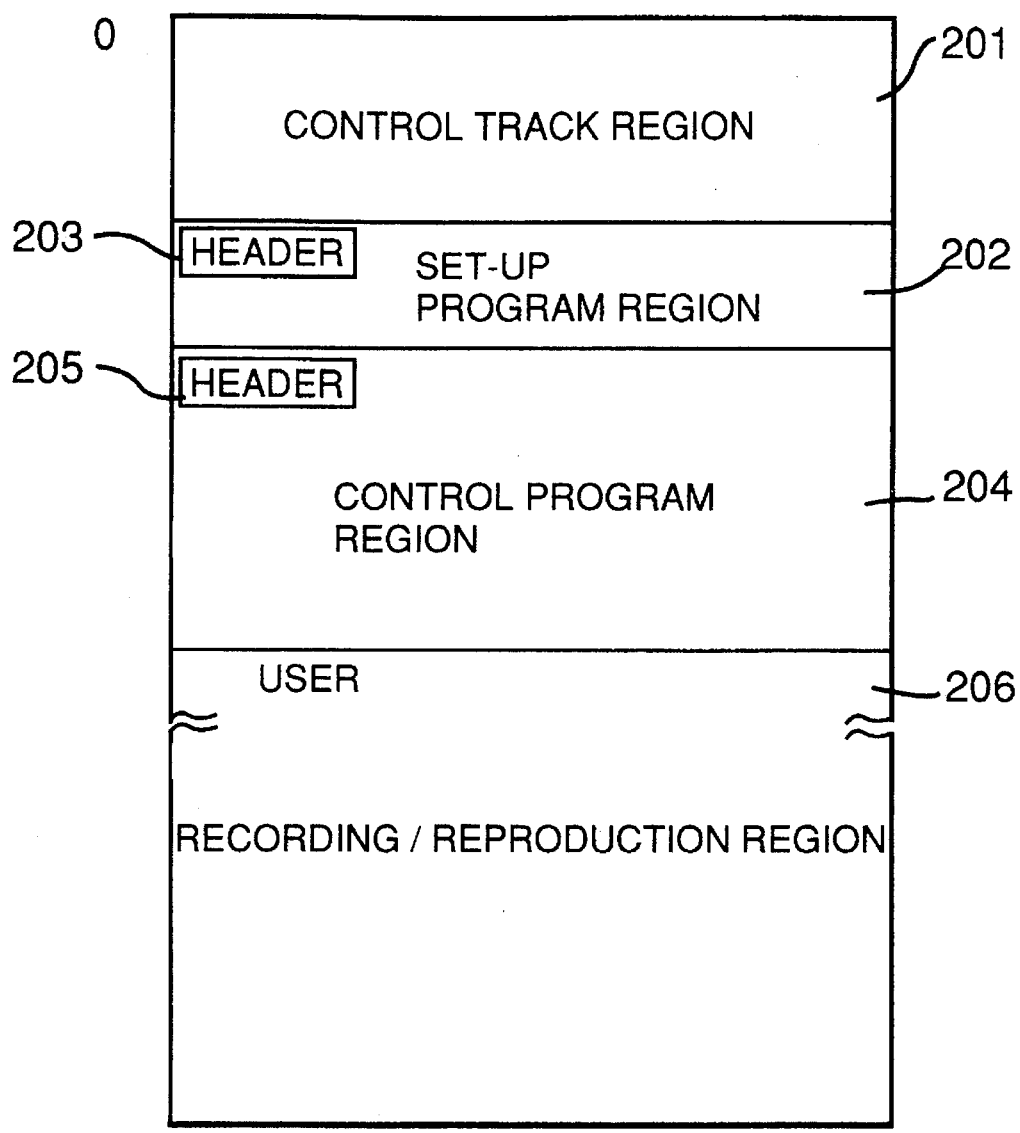
FIG. 2 shows an embodiment of the data format of the memory medium of the present invention.

FIG. 2 shows the data format of the disk 101. In FIG. 2, the reference numeral 201 denotes a control track region in which the attribute information, the format information, etc. of the disk are recorded in one sector and data of the same content are recorded in a plurality of sectors in a multiplexed manner. The specific content of this control track region 201 will be described later in detail. The reference numeral 202 designates a set-up program region in which a set-up program is multiplexly recorded. The reference numeral 203 denotes the header information of the set-up program region. This header information 203 is comprised of data of the same content as the data recorded in one sector which are repetitively recorded in a plurality of sectors. The header information 203 will be described later in detail. The reference numeral 204 designates a control program region in which a plurality of control programs to be renewed are repetitively recorded. The reference numeral 205 denotes the header information of the control program region 204. This header information 205 is comprised of data of the same content as the data recorded in one sector which are recorded in a plurality of sectors. The header information 205 will be described later in detail. The reference numeral 206 designates a user's recording reproduction region including an interchange region for a defective sector and a custody information region therefor.

Figure 3:
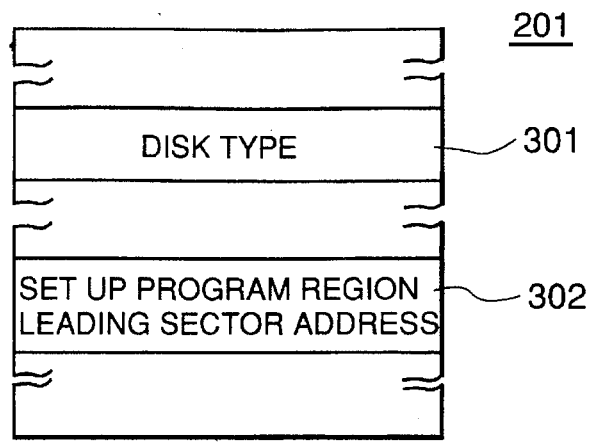
FIG. 3 shows an embodiment of the format of a control track region in the memory medium of the present invention.

FIG. 3 shows the specific content of the above-described control track region 201. In FIG. 3, the reference numeral 301 denotes a disk type for identifying the disk, and the reference numeral 302 designates the leading sector address of the set-up program region. When the disk is mounted on the apparatus, the content of the control track region 201 is first read out. At this time, it is first confirmed by the disk type 301 that the disk is a desired disk, whereafter the leading address of the set-up program is indicated by the leading sector address 302 of the set-up program region.

Figure 4:
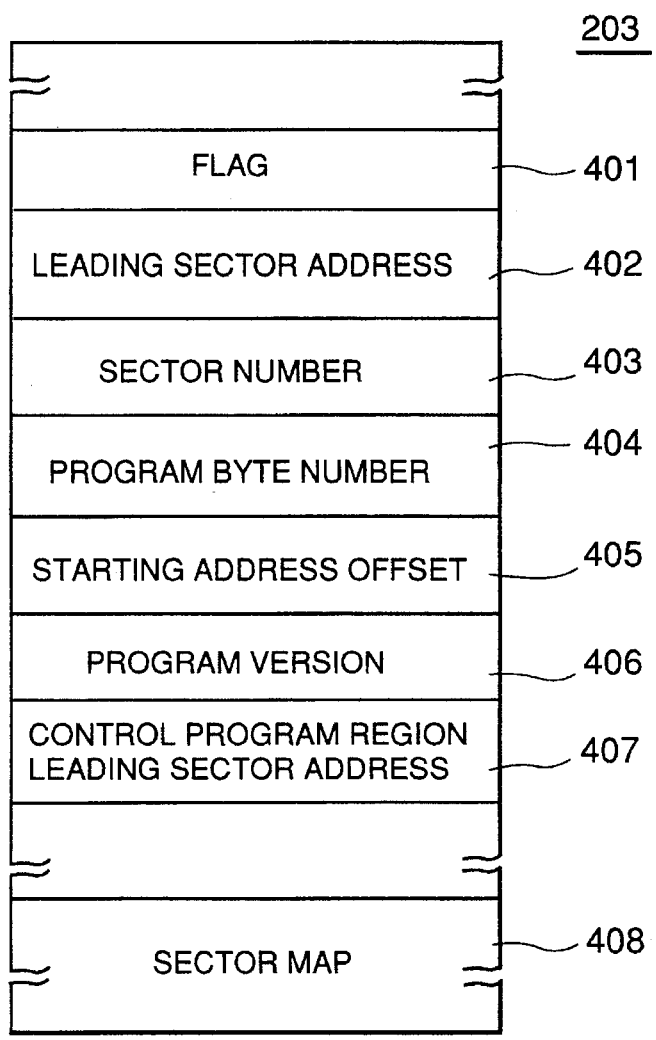
FIG. 4 shows an embodiment of the format of the header information of a set-up program region in the memory medium of the present invention.

FIG. 4 shows the specific content of the data recorded in one sectors of the header information 203 of the above-described set-up program region 202. A flag 401 indicates whether there are effective data in the set-up program region 202 and the control program region 204. In this example, when the flag is 0, it shows invalidity, and when the flag is 1, it shows effectiveness. The reference numeral 402 designates the leading sector address of the set-up program. The reference numeral 403 denotes the number of sectors of the set-up program, and the reference numeral 404 designates the number of program bytes indicative of the program size. The reference numeral 405 denotes a starting address offset, the reference numeral 406 designates a program version, and the reference numeral 407 denotes the leading address of the control program region 204. Further, the reference numeral 408 designates the sector map of the set-up program which will be described later in detail.

Figure 5:
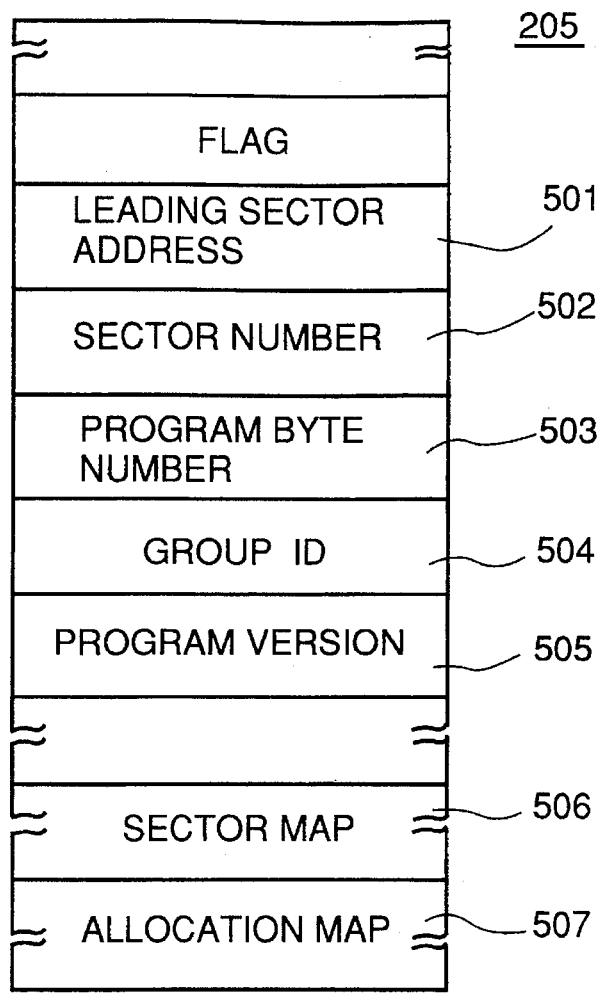
FIG. 5 shows an embodiment of the format of the header information of a control program region in the memory medium of the present invention.

FIG. 5 shows, of the header information 205 of the control program region 204, the specific content of the data recorded in one sector. In FIG. 5, the reference numeral 501 denotes the leading sector address of the control program region 204, the reference numeral 502 designates the number of sectors of the control program region 204, and the reference numeral 503 denotes the number of program bytes indicative of the program size of the control program. The reference numeral 504 designates a group ID for identifying the EEPROM 113, the reference numeral 505 denotes a program version, the reference numeral 506 designates a sector map which will be described later, and the reference numeral 507 denotes an allocation map indicative of the location of the control program which it is desired to modify.

Figure 6:
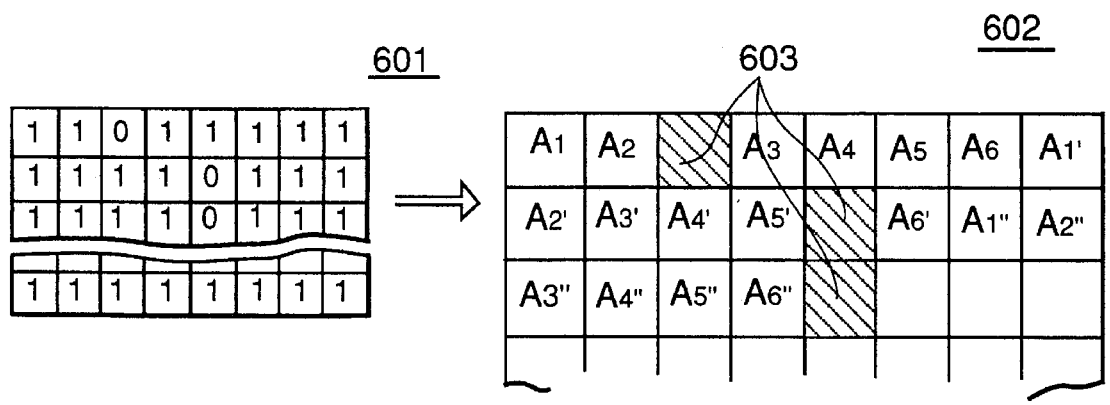
FIG. 6 shows the sector map of the set-up program region and the control program region in the medium of the present invention.

FIG. 6 is an illustration showing the specific content of the above-described sector map and in which the defective sectors of the set-up program region and the control program region, except the header, are mapped. The reference numeral 601 designates a sector map indicating the positions of defective sectors, and it is recorded in the respective header information 203 and 205. In FIG. 6, defective sectors are indicated by 0. The set-up program and the control program are recorded in a multiplexed manner, avoiding the defective sectors shown in the respective sector maps 408 and 506. The state of this is shown by the reference numeral 602 in FIG. 6. In this example, the pertinent programs are recorded in sectors A1 to A6 avoiding defective sectors 603, and further, a plurality of the same data are repetitively recorded.

Figure 7:
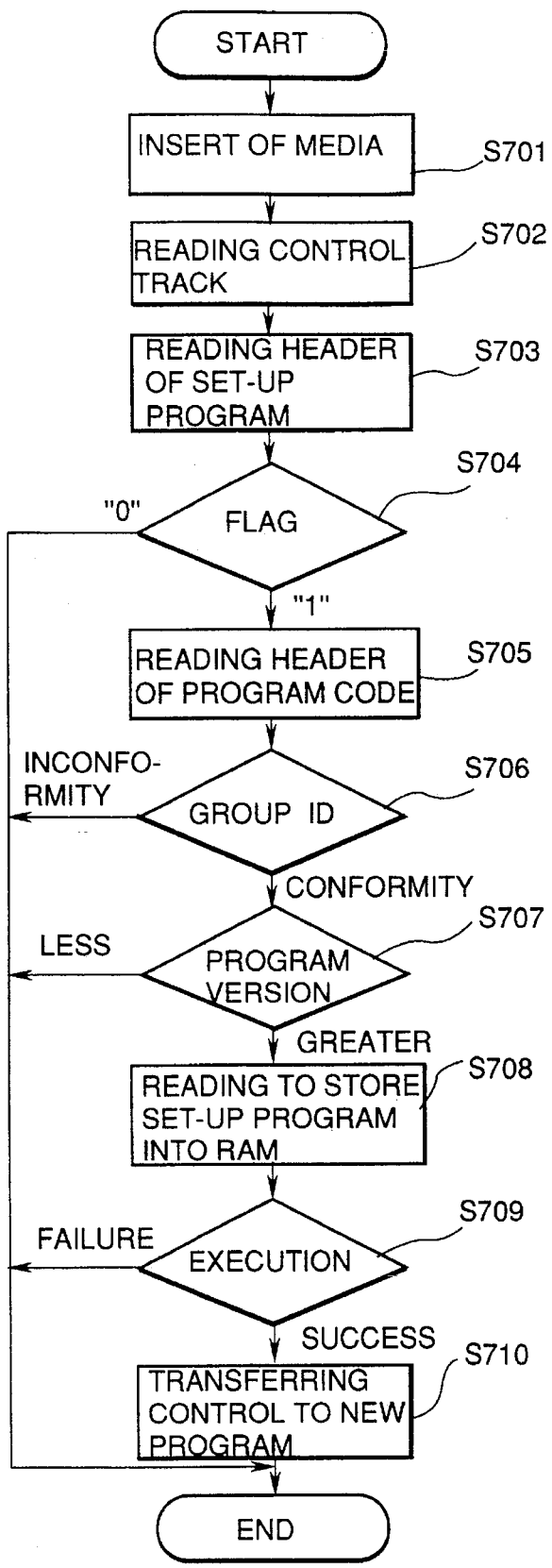
FIG. 7 is a flow chart for illustrating an embodiment of the method of the present invention of changing a control program.

The operation of the present embodiment will now be described with reference to a flow chart shown in FIG. 7.

When at S (step) 701, the disk 101 is mounted on the magneto-optical disk apparatus, the CPU 112 drives the spindle motor 110, and the pickup 102 is moved to the position of the control track by the linear motor 109. Subsequently, at S702, the CPU 112 commands so as to reproduce the control track, and loads the data thereof into the RAM 114. At S703, the header information 203 of the set-up program area 202 is read into the RAM 114 by the leading sector address 302 of the set-up program region in the control track information. A plurality of bits of header information are repetitively recorded with a posterioric sector defect taken into account.

At S704, whether the flag 401 in the header information 203 is 0 or 1 is discriminated, and if it is 0, the set-up flow is terminated. If it is 1, advance is made to S705. The flag 401, as previously described, indicates whether there are effective program data in the set-up program region 202 and the control program region 204, and in this example, 0 is invalidity and 1 is effectiveness. If this flag 401 is 1, at S705, the header information of the control program region 204 is read into the RAM 114 by the leading sector address 407 of the control program region. Next, at S706, whether the group ID (identification) 504 of the header and the group ID in the EEPROM 113 conform to each other is discriminated, and it is confirmed that the disk and the EEPROM have the same group ID. If here, the two groups do not conform to each other, the modification of the program is impossible and therefore, the set-up flow is terminated, and if the two groups conform to each other, advance is made to the next step, S707. The ID's of the groups are recorded on both the disk 101 and the EEPROM 113, as are codes for identifying each. Accordingly, if the ID's conform to each other, it is judged that the disk and the EEPROM have control programs belonging to the same group.

At S707, the magnitude relation between the program version 505 in the header and the program version in the EEPROM 113 is examined, and whether the control program of the EEPROM 113 is modified is discriminated. If at this time the program version 505 in the header is greater than that in the EEPROM 113, the control program of the EEPROM 113 is unmodified and therefore, advance is made to the next step, S708. If conversely, the program version 505 in the header is smaller than that in the EEPROM 113, the control program is already modified and therefore, the flow is terminated. The program version is what should be called a number changed during each renewal of the program, and for example, +1 is effected thereto during each renewal. Accordingly, by comparing this program version, the newness and oldness between the control program version can be discriminated. At S708, the set-up program is read into the RAM 114 in accordance with the sector map 408. Here, the necessary information, i.e., the leading sector address 402 in which the program is recorded, the number of sectors 403 and the number of program bytes 404, are recorded on the header 203.

Figure 8:
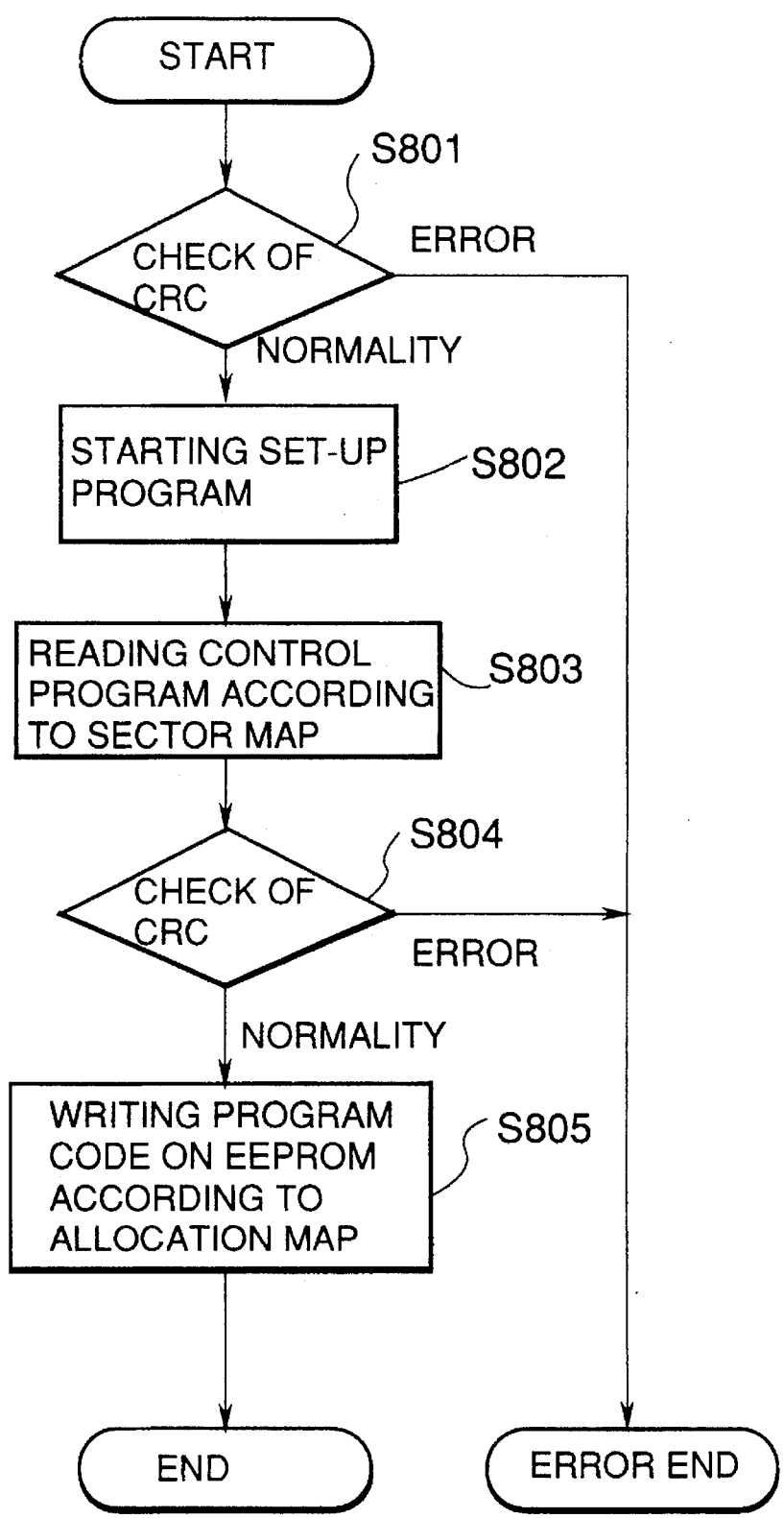
FIG. 8 is a flow chart for illustrating the set-up process of FIG. 7 in detail.

The content of the specific process of S709 is shown in the flow chart of FIG. 8. When the error terminates at S709, the set-up ends in failure. The details of S709 will hereinafter be described with reference to FIG. 8.

At S801, a CRC (cyclic redundancy check) added to the set-up program code read into the RAM 114 is first checked. If at this time, CRC is normal, advance is made to the next step, S802, and if CRC is not normal, the error is terminated. At S802, the start address is calculated from the starting address offset 405 of the header information, and the set-up program is started. Then, at S803, the control program is read into the RAM 114 in accordance with the sector map 506. Here, the necessary information, i.e., the leading sector address 501 in which the program is recorded, the number of sectors 502 and the number of program bytes 503, are recorded on the header 205. At S804, CRC added to the control program code likewise read into the RAM 114 is checked. If CRC is normal, advance is made to the next step, S805, and if the check of CRC is an error, the set-up flow is error-terminated.

At S805, the rewritten portion of the EEPROM 113, i.e., the modified portion of the control program, is erased in accordance with the memory allocation map 507. Then, the subsequently read control program code on the RAM 114 is written into the EEPROM 113 in accordance with the memory allocation map 507. If the process of S709 shown in FIG. 8 is terminated correctly, advance is made to the final step S710 of FIG. 7. At step S710, the newly rewritten control program of the EEPROM 113 is started and control is shifted to the new program code. By the above-described process, the control program of the EEPROM 113 is modified and renewed into a new control program. Of course, the partial modification of the control program by bug is not restrictive, but it is also possible to interchange the whole control program.

In the above-described embodiment, the control program of the information processing apparatus has been renewed by the use of a medium in which the version-upped control program is memorized. In the present invention, when the control program stored in the memory of the information processing apparatus on which the medium is mounted is a version newer than the control program memorized in the medium, the control program memorized in the medium may be rewritten into the control program stored in the memory. Thereby, when the rewritten medium is taken out of said apparatus and is mounted on another information processing apparatus in which the control program is not yet renewed, the control program of the another apparatus can be rewritten. Such a method will hereinafter be described with reference to the flow chart of FIG. 9. An information processing system for carrying out the method of FIG. 9, like the above-described embodiment, is constructed as shown in FIG. 1. Also, in the method of the present embodiment, use can be made of a memory medium having the format as illustrated in FIGS. 2 to 6.

When at S (step) 901, the disk 101 is first mounted on the magneto-optical disk apparatus, the CPU 112 drives the spindle motor 110 and the pickup 102 is moved to the position of the control track by the linear motor 109. Subsequently at S902, the CPU 112 commands so as to reproduce the control track, and loads the data thereof into the RAM 114. At S903, the header information 203 of the set-up program region 202 is read into the RAM 114 by the leading sector address 302 of the set-up program region in the control track information. In this case, the header information is recorded in a multiplexed manner with a posterioric sector defect taken into account.

At S904, whether the flag 401 in the header information 203 is 0 or 1 is discriminated, and if it is 0, advance is made to S911. If it is 1, advance is made to S905. The flag 401, as previously described, indicates whether there are effective program data in the set-up program region 202 and the control program region 204, and in this example, 0 is invalidity and 1 is effectiveness. If this flag 401 is 1, at S905, the header information of the control program area 204 is read into the RAM 114 by the leading sector address 407 of the control program region. Subsequently, at S906, whether the group ID 504 of the header and the group ID in the EEPROM 113 conform to each other is discriminated, and it is confirmed that the disk and the EEPROM have the same group ID. If here, the two groups do not conform to each other, the modification of the program is impossible and therefore, the set-up flow is terminated, and if the two groups conform to each other, advance is made to the next step, S907.

At S907, the magnitude relation between the program version 505 in the header 203 and the program version in the EEPROM 113 is examined, and whether the control program of the EEPROM 113 is modified is discriminated. If at this time, the program version 505 in the header is greater than that in the EEPROM 113, the control program of the EEPROM 113 is unmodified and therefore, advance is made to the next step, S908.

At S908, the set-up program is read into the RAM 114 in accordance with the sector map 408. Here, the necessary information, i.e., the leading sector address 402 in which the program is recorded, the number of sectors 403 and the number of program bytes 404 are recorded on the header 203.

On the other hand, if at S904, the flag 401 is 0, it means that the set-up program and the control program are not written into the disk 101. In such a case, at S911, the set-up program and control program of the EEPROM 113 are recorded on the predetermined recording areas of the disk 101. Also, if at S907, as the result of the comparison between the program versions of the header 203 and the EEPROM 113, the two program versions conform to each other, the two programs are the same and therefore, the flow is terminated. Further, if at S907, the program version in the header 203 is smaller than that in the EEPROM 113, it means that the program recorded on the disk 101 is old. Accordingly, at such time, the set-up program and control program of the EEPROM 113 are recorded on the disk 101, and the program of the disk 101 is modified into a new one.

Subsequently, at S909, the process of modifying the program of the EEPROM 113 is carried out, and the content of the specific process of S909 is similar to the operation described with reference to the flow chart of FIG. 8. If at this step S909, the process terminates in an error, the set-up ends in failure.

Figure 9:
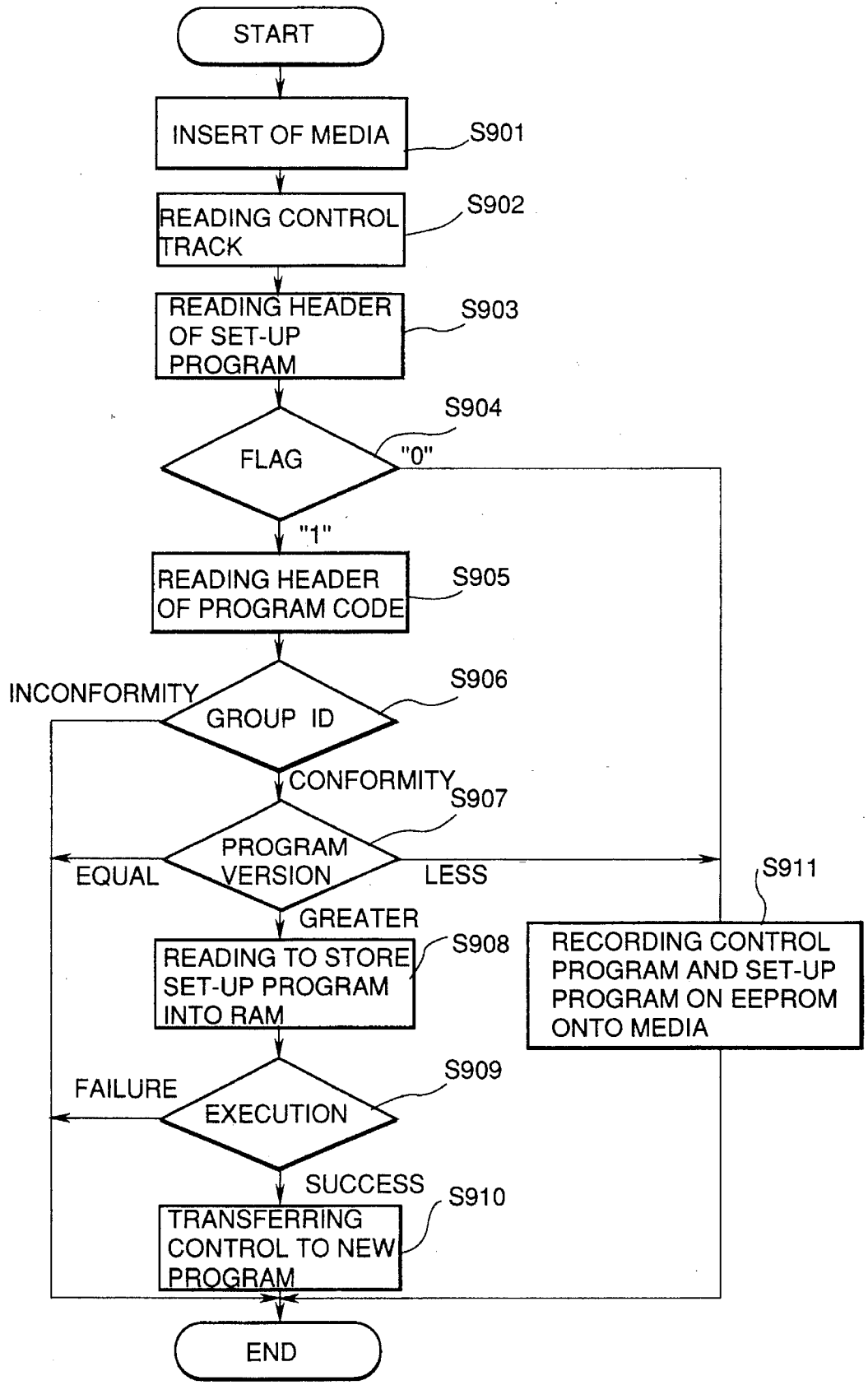
FIG. 9 is a flow chart for illustrating another embodiment of the method of the present invention of changing the control program.

If the process of S909 terminates correctly, advance is made to the final step S910 of FIG. 9. At this step S910, the newly rewritten control program of the EEPROM 113 is started and control is shifted to the new program code. The control program of the EEPROM 113 is modified by the above-described process and is renewed into a new control program.

Figure 10:
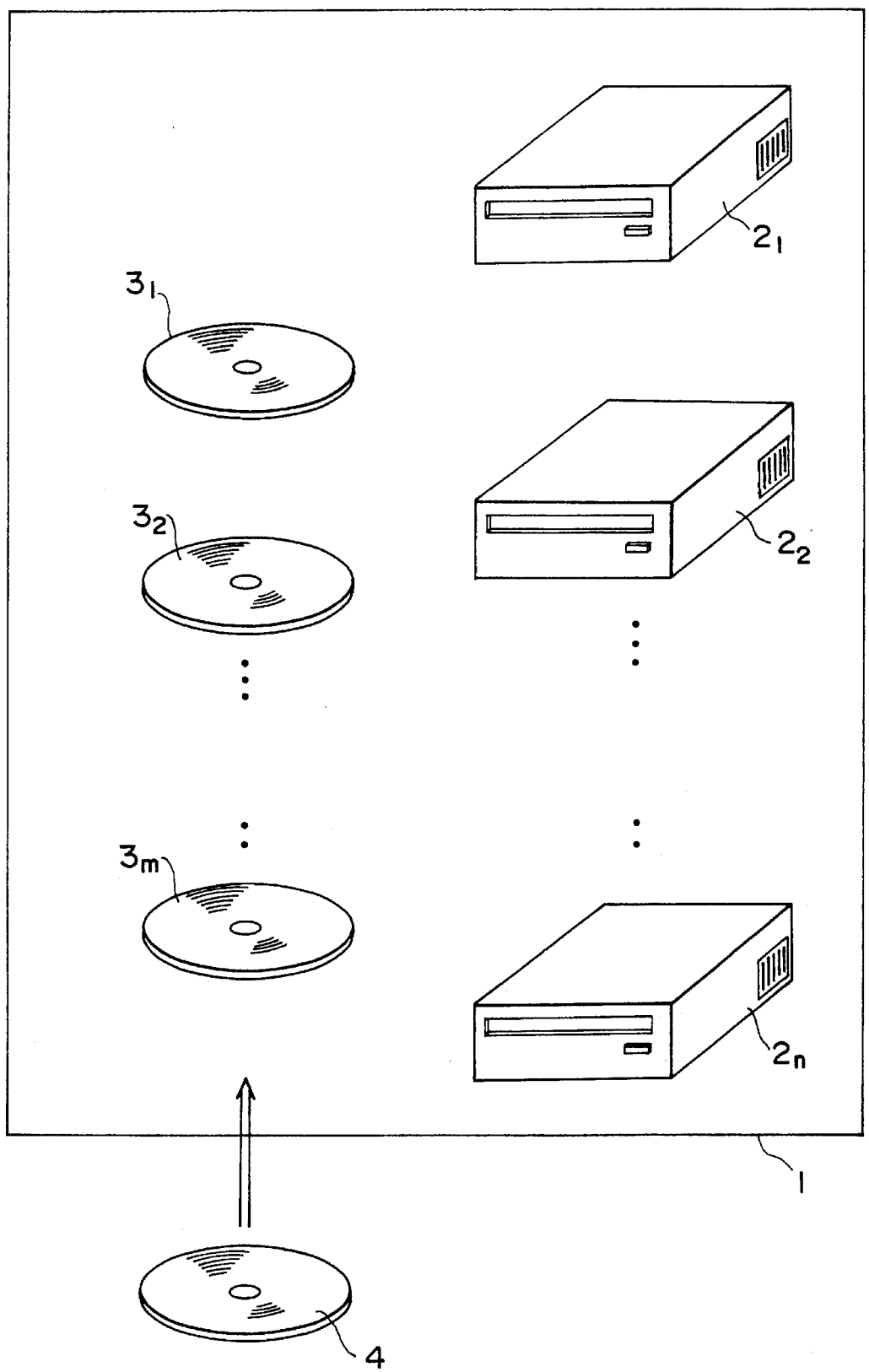
FIG. 10 is a schematic view for illustrating a method of renewing the control program using the present invention in a system comprised of a plurality of memory media and a plurality of information processing apparatuses.

As described above, according to the present invention, the user, even if unconscious of the renewal of the control program of the information processing apparatus, can operate the apparatus by the control program of the newest version simply by using a newly bought memory medium in this apparatus. An example of this will hereinafter be described with reference to FIG. 10.

Let it be assumed that a certain user uses an information processing system 1 comprised of n magneto-optical disk drives $2_1, 2_2, \ldots, 2_n$ and m magneto-optical disks $3_1, 3_2, \ldots, 3_m$. A control program of version A is stored in a rewritable memory contained in each of the magneto-optical disk drives $2_1, 2_2, \ldots, 2_n$. The recording or reproducing operation on each magneto-optical disk is controlled in accordance with this control program of version A. Control programs of version A are also recorded on the control program regions of the magneto-optical disks $3_1, 3_2, \ldots, 3_m$.

Here, when the above-discussed user has magneto-optical disk 4 on which is recorded obtained control version B of a program, that is, an updated version from version A, the control program stored in the memory of each magneto-optical disk drive is gradually rewritten into a control program of version B. For example, when the disk 4 is mounted on the drive $2_1$ and recording or reproduction is effected, the program stored in the memory of the drive $2_1$ is rewritten with version B of the program which is memorized in the disk 4, in accordance with the process described in connection with FIG. 9. Also, when this disk 4 is taken out of the drive $2_1$ and mounted on the drive $2_2$ and recording or reproduction is effected, the program stored in the memory of the drive $2_2$ is rewritten with a program of version B in the same manner.

On the other hand, when the disk $3_1$ is mounted on the drive $2_1$ in which the program has already been rewritten by the disk 4 and recording or reproduction is effected, the program recorded on the disk $3_1$ is rewritten with a program of version B in accordance with the process described in connection with FIG. 9. When this disk $3_1$ is taken out of the drive $2_1$ and is mounted on another drive, e.g. the drive $2_n$, the program stored in the memory of this drive $2_n$ is also rewritten with a program of version B.

In this manner, the version A programs in all the drives and disks are finally renewed with programs of version B. Accordingly, the version update of the information processing system is accomplished simply by the user additionally buying a new disk without the user being aware of the version update.

The present invention permits various applications thereof, besides the above-described embodiments. For example, the construction of the information processing apparatus is not limited to the example shown in FIG. 1, but may be another construction which performs a similar function. Further, the memory medium in which the control program is memorized is not limited to a magneto-optical disk, but may be a medium a such as a magnetic disk, an optical card or a magnetic card. The present invention covers all the above-described applications without departing from the scope of the invention as defined in the appended claims.

What is claimed is:

1. A recording and/or reproducing apparatus for effecting at least one of information recording and reproduction by instruction from a host computer, said apparatus effecting at least one of the recording of information on and reproduction of information from a memory medium in which a control program is stored and being removably mounted in said apparatus, the control program stored in the memory medium including a region for storing information indicative of its version, said apparatus comprising:

a rewritable memory for storing a control program for controlling the apparatus, the control program stored in said rewritable memory including a region for storing information indicative of its version;

discriminating means for discriminating whether the control program stored in the memory medium is a control program of the same type as, and replaceable with, the control program stored in said rewritable memory, wherein when said discriminating means discriminates that the control program stored in the memory medium is not a control program of the same type as the control program stored in said rewritable memory, a control program of an older version is not replaced with a control program of a newer version;

comparison means for comparing the version of the control program stored in said rewritable memory with the version of the control program stored in the memory medium; and means for replacing a control program of an older version with a control program of a newer version in conformity with the discrimination made by said discriminating means and the comparison made by said comparison means.

2. An information processing apparatus according to claim 1, wherein the memory medium comprises a magneto-optical disk.

3. A method of replacing a first control program for controlling a recording and/or reproducing apparatus for effecting at least one of recording and reproduction by instruction from a host computer, the first control program being stored in a rewritable memory of the recording and/or reproducing apparatus and having a region for storing information indicative of its version, with a second control program stored in a memory medium removably mounted in the recording and/or reproducing apparatus, the second control program including a region for storing information indicative of its version, said method comprising the steps of:

discriminating whether the control program memorized in the memory medium is a program of the same type as, and replaceable with, the control program stored in the rewritable memory, wherein when it is discriminated that the control program memorized in the memory medium is not a program of the same type as the control program stored in the rewritable memory, a control program of an older version is not replaced with a control program of a newer version;

comparing the version of the control program stored in the rewritable memory with the version of the control program stored in the memory medium; and replacing a control program of an older version with a control program of a newer version, in conformity with the results of said discriminating step and said comparing step.

4. A method according to claim 3, wherein the memory medium comprises a magneto-optical disk.

5. A recording and/or reproducing apparatus for effecting at least one of information recording and reproduction by instruction from a host computer, said apparatus effecting at least one of recording of information on and reproduction of information from a memory medium in which a control program is stored, the control program including a region for storing information indicative of its version and the memory medium being removably mounted in said apparatus, said apparatus comprising:

a rewritable memory for storing a control program for effecting control of said apparatus, the control program stored in said rewritable memory including a region for storing version information indicative of its version;

discriminating means for discriminating whether the control program stored in the memory medium is a control program of the same type as, and replaceable with, the control program stored in said rewritable memory, wherein when said discriminating means discriminates that the control program stored in the memory medium is not a control program of the same type as the control program stored in said rewritable memory, the control program stored in said rewritable memory is not replaced with the control program from the memory medium;

first judging means for reading the version information from the control program stored in said rewritable memory and the version information from the control program stored in the memory medium, and for comparing the version information to judge whether the control program stored in said rewritable memory should be replaced with the control program stored in the memory medium, which is when the version of the control program stored in said rewritable memory is older than the version of the control program stored in the memory medium;

means for reading out the control program from the memory medium when said discriminating means discriminates that the control program stored in the memory medium is a control program of the same type as, and replaceable with, the control program stored in said rewritable memory and said first judging means judges that the control program stored in said rewritable memory should be replaced; and means for replacing the control program stored in said rewritable memory with the control program read out from the memory medium.

6. An information processing apparatus according to claim 5, further comprising (i) second judging means for judging whether the control program stored in the memory medium should be replaced with the control program stored in said rewritable memory, (ii) means for reading out the control program from said rewritable memory when said second judging means judges that the control program stored in the memory medium should be replaced, and (iii) means for recording the control program read out from said rewritable second memory onto the memory medium.

7. An information processing apparatus according to claim 6, wherein said second judging means compares the version information of the control program stored in said rewritable memory with the version information of the control program stored in the memory medium, and said second judging means judges that the control program stored in the memory medium should be replaced when the version of the control program stored in the memory medium is older than the version of the control program stored in said rewritable memory.

8. An information processing apparatus according to claim 5, wherein the control program stored in the memory medium and the control program stored in said rewritable memory include identification codes indicative of the types of the programs, and said discriminating means comprises means for comparing these identification codes.

9. An information processing apparatus according to claim 5, wherein said memory medium comprises a magneto-optical disk.

10. A method of replacing a first control program for controlling a recording and/or reproducing apparatus for effecting at least one of recording and reproduction by instruction from a host computer, the first control program being stored in a rewritable memory of the recording and/or reproducing apparatus and having a region for storing information indicative of its version, with a second control program stored in a memory medium removably mounted in the recording and/or reproducing apparatus, the second control program including a region for storing information indicative of its version, said method comprising the steps of:

reading the information indicative of the version of the first control program stored in the rewritable memory and the information indicative of the version of the second control program stored in the memory medium and comparing that information;

discriminating whether the control program memorized in the memory medium is a program of the same type as, and replaceable with, the control program stored in the rewritable memory, wherein when it is discriminated that the control program memorized in the memory medium is not a program of the same type as the control program stored in the rewritable memory, the control program stored in the rewritable memory is not rewritten with the control program of the memory medium;

judging whether the first control program stored in the rewritable memory should be replaced with the second control program stored in the memory medium, which is when the version of the first control program stored in the rewritable memory is older than the version of the second control program stored in the memory medium;

reading the second control program out of the memory medium when it is discriminated that the control program memorized in the memory medium is a program of the same type as, and replaceable with, the control program stored in the rewritable memory and it is judged that the first control program stored in the rewritable memory should be replaced; and rewriting the first control program stored in the rewritable memory with the second control program read out of the memory medium.

11. A method according to claim 10, further comprising (i) a second judging step of judging whether the control program memorized in the memory medium should be replaced with the control program stored in the rewritable memory, (ii) reading the control program out of the rewritable memory when it is judged that the control program memorized in the memory medium should be replaced, and (iii) recording the control program taken out of the memory onto the memory medium.

12. A method according to claim 11, wherein said second judging step comprises comparing the information indicative of the version of the first control program stored in the rewritable memory with the information indicative of the version of the second control program stored in the memory medium and when the version of the second control program stored in the memory is older than the version of the first control program stored in the rewritable memory, it is judged that the second control program stored in the memory medium should be replaced.

13. A method according to claim 10, wherein the control program memorized in the memory medium and the control program stored in the rewritable memory include discrimination codes indicative of the types of the programs, and said discriminating step comprises comparing these discrimination codes.

14. A method according to claim 10, wherein the memory medium comprises a magneto-optical disk.

15. A recording and/or reproducing apparatus for effecting at least one of information recording and reproduction by instruction from a host computer, said apparatus effecting at least one of recording of information on and reproduction of information from a memory medium having a control program stored therein and being removably mounted in said apparatus, the control program stored in the memory medium including a region for storing information indicative of its version, said apparatus comprising:

a rewritable memory for storing a control program for controlling said apparatus, the control program stored in said rewritable memory including a region for storing information indicative of its version;

discriminating means for discriminating whether the control program stored in the memory medium is a control program of the same type as, and replaceable with, the control program stored in said rewritable memory, wherein when said discriminating means discriminates that the control program stored in the memory medium is not a control program of the same type as the control program stored in said rewritable memory, the control program stored in said rewritable memory is not recorded onto the memory medium;

judging means for reading the version information from the control program stored in said rewritable memory and the version information from the control program stored in the memory medium, and for comparing the version information to judge whether the control program stored in the memory medium should be replaced with the control program stored in said rewritable memory, which is when the version of the control program stored in the memory medium is older than the version of the control program stored in said rewritable memory;

means for reading the control program out of said rewritable memory when said discriminating means discriminates that the control program stored in the memory medium is a control program of the same type as, and replaceable with, the control program stored in said rewritable memory and said judging means judges that the control program stored in the memory medium should be replaced; and means for recording the control program read out of said rewritable memory onto the memory medium.

16. An information processing apparatus according to claim 15, wherein the memory medium comprises a magneto-optical disk.

17. A recording and/or reproducing apparatus for effecting at least one of information recording and reproduction by instruction from a host computer, said apparatus effecting at least one of recording of information on and reproduction of information from a memory medium having a control program stored therein and being removably mounted in said apparatus, the control program stored in the memory medium including a region for storing information indicative of its version, said apparatus comprising:

a rewritable memory for storing a control program for controlling said apparatus, the control program stored in said rewritable memory including a region for storing information indicative of its version;

discriminating means for discriminating whether the control program stored in the memory medium is a control program of the same type as, and replaceable with, the control program stored in said rewritable memory, Wherein when said discriminating means discriminates that the control program stored in the memory medium is not a control program of the same type as the control program stored in said rewritable memory, the control program stored in the memory medium is not rewritten into the control program of said rewritable memory;

judging means for reading the version information from the control program stored in said rewritable memory and the version information from the control program stored in the memory medium, and for comparing the version information to judge whether the control program stored in the memory medium should be replaced with the control program stored in said rewritable memory, which is when the version of the control program stored in the memory medium is older than the version of the control program stored in said rewritable memory;

means for reading the control program out of said rewritable memory when said discriminating means discriminates that the control program stored in the memory medium is a control program of the same type as, and replaceable with, the control program stored in said rewritable memory and said judging means judges that the control program stored in the memory medium should be replaced; and means for rewriting the control program stored in the memory medium into the control program read out of said rewritable memory.

18. An information processing apparatus according to claim 17, wherein the memory medium comprises a magneto-optical disk.

19. A method of replacing a first control program for controlling a recording and/or reproducing apparatus for effecting at least one of recording and reproduction by instruction from a host computer, the first control program being stored in a rewritable memory of the recording and/or reproducing apparatus and having a region for storing information indicative of its version, with a second control program stored in a memory medium removably mounted in the recording and/or reproducing apparatus, the second control program including a region for storing information indicative of its version, said method comprising the steps of:

reading the information indicative of the version of the first control program stored in the rewritable memory and the information indicative of the version of the second control program stored in the memory medium and comparing that information;

discriminating whether the control program memorized in the memory medium is a program of the same type as, and replaceable with, the control program stored in the rewritable memory, wherein when it is discriminated that the control program memorized in the memory medium is not a program of the same type as the control program stored in the rewritable memory, the control program stored in the rewritable memory is not recorded onto the memory medium;

judging whether the control program stored in the memory medium should be replaced with the control program stored in the rewritable memory, which is when the version of the control program stored in the memory medium is older than that of the control program stored in the rewritable memory;

reading the control program out of the rewritable memory when it is discriminated that the control program memorized in the memory medium is a program of the same type as, and replaceable with, the control program stored in the rewritable memory and it is judged that the control program stored in the memory medium should be replaced; and recording the control program read out of the rewritable memory onto the memory medium.

20. A method according to claim 19, wherein the memory medium comprises a magneto-optical disk.

21. An information processing system comprising:

a removable memory medium for storing a control program that includes a region for storing information indicative of its version; and an apparatus for effecting at least one of recording of information on and reproduction of information from said memory medium, said apparatus comprising:

a rewritable memory for storing a control program for controlling said apparatus, the control program stored in said rewritable memory including a region for storing information indicative of its version;

discriminating means for discriminating whether the control program stored in said memory medium is a control program of the same type as, and replaceable with, the control program stored in said rewritable memory, wherein when said discriminating means discriminates that the control program stored in the memory medium is not a control program of the same type as the control program stored in said rewritable memory, the control program stored in said rewritable memory is not replaced with the control program from said memory medium;

judging means for reading the version information from the control program stored in said rewritable memory and the version information from the control program stored in said memory medium, and for comparing the version information to judge whether the control program stored in said rewritable memory should be replaced with the control program stored in said memory medium, which is when the version of the control program stored in said rewritable memory is older than the version of the control program stored in said memory medium;

means for reading out the control program from said memory medium when said discriminating means discriminates that the control program stored in the memory medium is a control program of the same type as, and replaceable with, the control program stored in said rewritable memory and said judging means judges that the control program stored in said rewritable memory should be replaced; and means for replacing the control program stored in said rewritable memory with the control program read out from said memory medium.

22. An information processing system according to claim 21, wherein said apparatus further comprises second judging means for judging whether the control program stored in said memory medium should be replaced with the control program stored in said rewritable memory, means for reading the control program out of said memory when said second judging means judges that the control program stored in said memory medium should be replaced, and means for recording the control program read out of said memory onto said medium.

23. An information processing system according to claim 22 wherein said second judging means compares the version information of the control program stored in said rewritable memory with the version information of the control program stored in said memory medium and said second judging means judges that the control program stored in said memory medium should be replaced when the version of the control program stored in said memory medium is older than the control program stored in said rewritable memory.

24. An information processing system according to claim 21, wherein the control program stored in said memory medium and the control program stored in said rewritable memory include discrimination codes indicative of the types of the respective programs, and said discriminating means comprises means for comparing the respective discrimination codes.

25. An information processing system according to claim 21, wherein said memory medium comprises a magneto-optical disk.

26. An information processing system comprising:

a removable memory medium for storing a control program that includes a region for storing information indicative of its version; and an apparatus for effecting recording of information onto said removable memory medium, said apparatus comprising:

a memory for storing a control program for controlling said apparatus, the control program stored in said memory including a region for storing information indicative of its version;

discriminating means for discriminating whether the control program stored in said memory medium is a control program of the same type as, and replaceable with, the control program stored in said memory, wherein when said discriminating means discriminates that the control program stored in said memory medium is not a control program of the same type as the control program stored in said memory, the control program of said memory is not recorded onto said memory medium;

judging means for reading the version information from the control program stored in said memory and the version information from the control program stored in said memory medium, and for comparing the version information to judge whether the control program stored in said memory medium should be replaced with the control program stored in said memory, which is when the version of the control program stored in said memory medium is older than the version of the control program stored in said memory;

means for reading the control program out of said memory when said discriminating means discriminates that the control program stored in said memory medium is a control program of the same type as, and replaceable with, the control program stored in said memory and said judging means judges that the control program stored in said memory medium should be replaced; and means for recording the control program read out of said memory onto said memory medium.

27. An information processing system according to claim 26, wherein said memory medium comprises a magneto-optical disk.

28. An information processing system comprising:

a removable memory medium capable of rewriting information and having a control program stored therein, the control program stored in said memory medium including a region for storing information indicative of its version; and an apparatus for effecting recording of information onto said removable memory medium, said apparatus comprising:

a memory for storing a control program for controlling said apparatus, the control program stored in said memory including a region for storing information indicative of its version;

discriminating means for discriminating whether the control program stored in said memory medium is a control program of the same type as, and replaceable with, the control program stored in said memory, wherein when said discriminating means discriminates that the control program stored in said memory medium is not a control program of the same type as the control program stored in said memory, the control program stored in said memory medium is not replaced with the control program of said memory;

judging means for reading the version information from the control program stored in said memory and the version information from the control program stored in said memory medium, and for comparing the version information to judge whether the control program stored in said memory medium should be replaced with the control program stored in said memory, which is when the version of the control program stored in said memory medium is older than the version of the control program stored in said memory;

means for reading the control program out of said memory when said discriminating means discriminates that the control program stored in said memory medium is a control program of the same type as, and replaceable with, the control program stored in said memory and said judging means judges that the control program stored in said memory medium should be replaced; and means for replacing the control program stored in said memory medium with the control program read out of said memory.

29. An information processing system according to claim 28, wherein said memory medium comprises a magneto-optical disk.

30. An information processing system comprising:

a removable memory medium for storing a control program that includes a region for storing information indicative of its version; and an apparatus for effecting at least one of recording of information on and reproduction of information from said removable memory medium, said apparatus comprising:

a rewritable memory for storing a control program for controlling said apparatus, the control program stored in said memory including a region for storing information indicative of its version;

discriminating means for discriminating whether the control program stored in said memory medium is a control program of the same type as, and replaceable with, the control program stored in said rewritable memory, wherein when said discriminating means discriminates that the control program stored in said memory medium is not a control program of the same type as the control program stored in said rewritable memory, a control program of an older version is not replaced with a control program of a newer version;

comparing means for comparing the version of the control program stored in said rewritable memory with the version of the control program stored in said memory medium; and means for replacing a control program of an older version with a control program of a newer version, in conformity with the discrimination made by said discriminating means and the comparison made by said comparing means.

31. An information processing system according to claim 30, wherein said memory medium comprises a magneto-optical disk.

* * * * *

UNITED STATES PATENT AND TRADEMARK OFFICE
CERTIFICATE OF CORRECTION

PATENT NO. : 5,608,910
DATED : March 4, 1997
INVENTOR(S) : MASAMI SHIMAKURA

It is certified that error appears in the above-indentified patent and that said Letters Patent is hereby corrected as shown below:

<u>COLUMN 5</u>

Line 5, "sectors" should read --sector--.

<u>COLUMN 7</u>

Line 20, "another" should read --other--.

<u>COLUMN 9</u>

Line 20, "a such" should read --such--.

<u>COLUMN 13</u>

Line 33, "Wherein" should read --wherein--.

Signed and Sealed this

Second Day of September, 1997

*Attest:*

BRUCE LEHMAN

*Attesting Officer*     Commissioner of Patents and Trademarks